US006370318B1

United States Patent
Iwaki

(10) Patent No.: US 6,370,318 B1
(45) Date of Patent: Apr. 9, 2002

(54) PC ANALOG OUTPUT SIGNAL CONTROL FOR COPY PROTECT

(75) Inventor: Tsutomu Iwaki, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/176,097

(22) Filed: Oct. 21, 1998

(30) Foreign Application Priority Data

Oct. 31, 1997 (JP) ............................................. 9-300460

(51) Int. Cl.[7] ................................................. H04N 5/91
(52) U.S. Cl. ......................................... 386/94; 380/203
(58) Field of Search ............................... 386/46, 94, 95, 386/125, 126; 380/201, 203, 210; 708/100

(56) References Cited

U.S. PATENT DOCUMENTS

| 5,570,198 A | 10/1996 | Cho | |
| 5,579,120 A | 11/1996 | Oguro | |
| 5,825,968 A | * 10/1998 | Nishigaki et al. | 386/94 |
| 5,915,018 A | * 6/1999 | Aucsmith | 380/201 |
| 6,006,243 A | * 12/1999 | Karidis | 708/100 |
| 6,122,377 A | * 9/2000 | Bromba et al. | 380/203 |
| 6,169,847 B1 | * 1/2001 | Mizoguchi et al. | 386/125 |

FOREIGN PATENT DOCUMENTS

| DE | 19525425 C1 | * 10/1996 |
| JP | 9-83920 | 3/1997 |
| JP | 9-98381 | 4/1997 |
| JP | 9-186965 | 7/1997 |

* cited by examiner

Primary Examiner—Huy Nguyen
(74) Attorney, Agent, or Firm—Finnegan, Henderson, Farabow, Garrett, & Dunner, L.L.P.

(57) ABSTRACT

When a copy-inhibited source such as a DVD title or a digital satellite broadcast is inputted, or a DVD-ROM drive is loaded, output of an image signal for an external CRT display or a TV image signal by a VGA controller is inhibited by generating a protect signal under the control of hardware or software, disabling a buffer, a DAC, and a TV encoder, and switching a selector. Accordingly, illicit copying of an image source using output of an image signal for an external image unit can be prevented.

17 Claims, 5 Drawing Sheets

PC ANALOG OUTPUT SIGNAL CONTROL FOR COPY PROTECT

BACKGROUND OF THE INVENTION

This application is based on Japanese Patent Application No. 9-300460, filed Oct. 31, 1997, the content of which is incorporated by reference.

The present invention relates to an image display unit, computer system, and image signal output control method in which an inputted image source is converted into an image signal for an external display or a TV image signal, and the converted image signal can be output.

In recent years, various multimedia computer systems have been developed along with advances in computer and multimedia technology. A computer system of this type has a function of reproducing video data and audio data in addition to text data and graphics data.

With the development of multimedia computers, DVDs are recently receiving a great deal of attention as new storage media in place of CD-ROMs. One side of one DVD-ROM medium allows to record 4.7-Gbyte data, which is about seven times larger than data on a current CD-ROM. Two sides allow to record 9.4-Gbyte data. Using such a DVD-ROM medium enables to reproduce the title such as a movie including a large amount of image information on a computer with a high quality.

Recently, portable, space-saving, battery drivable notebook personal computers are replacing desktop computers as home and office computers. Such a notebook personal computer also requires the above DVD-ROM drive unit.

When a title recorded on a DVD is to be reproduced on a notebook computer, data read by a DVD-ROM drive unit is stored in the main memory of the computer, and then transferred to an MPEG2 decoder. The MPEG2 decoder descrambles the data to cancel scrambling performed for a coded video data stream in order to prevent illicit copying of a title. The MPEG2 decoder decodes and expands the coded video data stream. The decoded video data is displayed on a notebook computer display monitor such as an LCD. At the same time, the decoded video data is converted into an analog image signal for an external CRT display or a TV analog image signal, and the converted analog image signal is externally output.

In this manner, the analog image signal is output to an external image unit such as a CRT display or a TV regardless of whether the image source requires a copy protect. Using the analog image signal allows illicit copying of an image source requiring a copy protect such as a DVD title.

In recent computers, a higher-speed CPU and an improved display controller realize advanced graphics processing such as three-dimensional graphics processing even in a personal computer such as a notebook computer. Graphics data can interactively change a display image in accordance with the user operation so as to allow the user to freely scroll on the display. Accordingly, demands arise for realizing new entertaining images by synthesizing computer graphics data and natural video data by MPEG2 and displaying the synthesized data by a display controller.

In this case, an analog image signal for an external image unit such as a TV must be generated on the display controller side. This analog image signal also requires an illicit copying prevention measure.

BRIEF SUMMARY OF THE INVENTION

It is an object of the present invention to provide an image display unit, computer system, and image signal output control method in which output of an image signal for an external image unit can be controlled in accordance with the type of image source and the type of input device, and illicit copying of an image source requiring a copy protect can be prevented.

To achieve the above object, according to the present invention, there is provided a computer system, comprising: means for inputting an image source; means for displaying the inputted image source on a flat panel display; means for converting the inputted image source into an image signal for an external display or a TV image signal; means for outputting the converted image signal externally; determining means for determining whether or not the image source requires a copy protect; and image signal output control means for inhibiting the output means from outputting the image signal for the external display or the TV image signal externally.

In this computer system, for example, when a copy-inhibited source such as a DVD title or a digital satellite broadcast is inputted, output of an image signal for an external display or a TV image signal is inhibited. The image source is displayed on only a dedicated display monitor constituted using a flat panel display such as an LCD.

In general, a display signal on the flat panel display is digital data using a dedicated interface. In a notebook computer, the flat panel display is mounted on the computer main body. A display signal on this flat panel display is not externally output. It is therefore difficult to illicitly copy an image source using the display signal on the flat panel display in practice. An image source can be prevented from illicit copying.

The computer system of the present invention further comprises a decoding unit for decoding a digitally compressed and coded video signal, a first TV signal converting means for converting the video signal decoded by the decoding unit into a first copy-protected TV image signal and for outputting the converted signal, a display control unit for controlling a display monitor and capable of displaying on the display a synthesized image signal of the video signal decoded by the decoding unit and graphics data written in an image memory, and a second TV signal converting means for converting the image signal obtained from the display control unit into a second TV image signal and outputting the converted image signal. When the image source requires a copy protect, or the image source is read by a drive unit which can read the image source requiring a copy protect from a storage medium, the image signal output control means switches the TV image signal to be output externally from the second TV image signal to the first TV image signal which has been copy-protected.

In this arrangement, as for an image source not requiring any copy protect, an entertaining image can be output to an external TV by the second TV image signal which can be synthesized with graphics data. When an image source requiring a copy protect is to be displayed, or a video signal read by a specific input device such as a DVD drive is to be displayed, the TV image signal to be output externally is switched from the second TV image signal to the first TV image signal which has been copy-protected. By controlling output of the TV image signal in accordance with the type of image source and the type of input device, an entertaining image can be displayed by synthesizing video data and graphics data, and at the same time a copy protect can be achieved.

According to the present invention, output of an image signal for an external image unit can be controlled in accordance with the type of image source and the type of input device. An image source requiring a copy protect can be prevented from illicit copying. Particularly in a notebook computer, only output of an analog RGB signal for an external CRT display or a TV analog image signal can be inhibited, while a display monitor constituted by, e.g., an LCD maintains the display. Therefore, illicit copying can be efficiently prevented.

Additional objects and advantages of the invention. will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will be described below with reference to the several views of the accompanying drawing.

Figure 1:
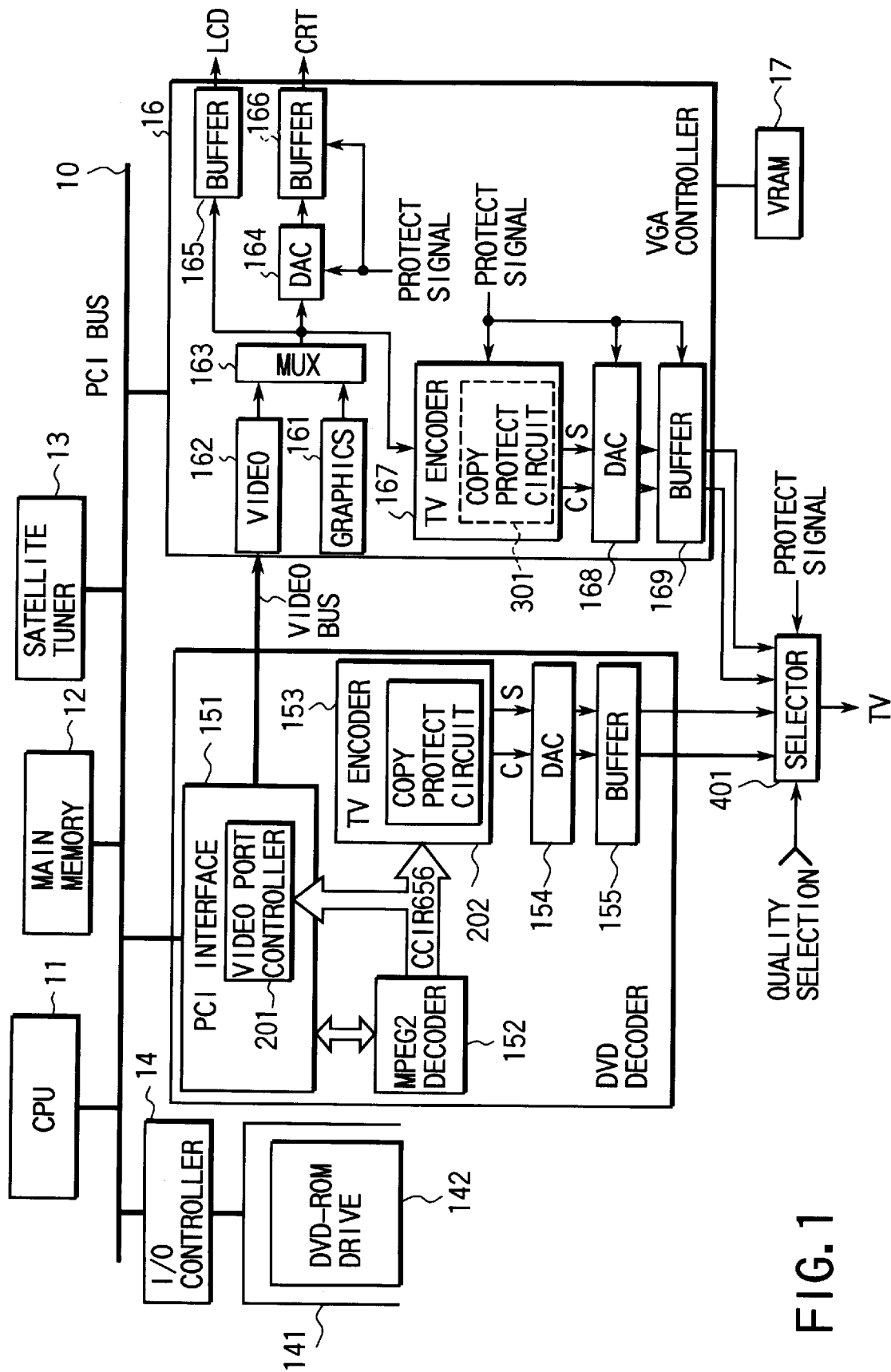
FIG. 1 is a block diagram showing the arrangement of a computer system according to an embodiment of the present invention.

FIG. 1 shows the system arrangement of a personal computer according to an embodiment of the present invention. This personal computer is a notebook computer with a flat panel display such as an LCD openably mounted on the computer main body. As shown in FIG. 1, the notebook computer comprises a PCI bus 10, a CPU 11, a main memory 12, a satellite tuner 13, an I/O controller 14, a DVD decoder 15, a VGA controller 16, and an image memory (VRAM) 17.

The CPU 11 controls the whole system operation, and executes an operating system stored in the main memory 12 and objective application programs. The CPU 11 executes various driver programs for hardware control and DVD application programs to transfer and reproduce data recorded on a DVD-ROM medium.

The satellite tuner 13 receives image data transmitted from digital satellite broadcasting and transfers it to the main memory 12. When image data by digital satellite broadcasting is formed of an MPEG2 stream, the data is decoded by the MPEG2 decoder of the DVD decoder 15, similar to video data read by a DVD-ROM drive 142.

The I/O controller 14 is connected to a device bay 141 for selectively loading the DVD-ROM drive 142 into the computer main body, and exchanges data with the DVD-ROM drive 142 loaded into the device bay 141.

The DVD-ROM drive 142 reads, at a maximum transfer rate of 10.8 Mbps, a data stream recorded on a DVD medium having a storage capacity of about 10 Gbytes on two disk surfaces. A DVD title such as a movie can be recorded on the DVD medium. The movie information can include video data, sub-picture data (sub-field data) having a maximum of 16 channels, and audio data having a maximum of 32 channels. In this case, these video data, sub-picture data, and audio data are digitally compressed, coded, and recorded by the MPEG2 standard. According to the MPEG2 standard, data coded by the MPEG2 standard can include another coded data. These coded data are processed as one MPEG2 program stream.

Video data is coded using MPEG2, whereas sub-picture data and audio data are respectively coded using run length coding and DOLBY DIGITAL coding. Also in this case, the coded video, sub-picture, and audio data are processed as one MPEG2 program stream.

Coding complying with the MPEG2 standard is variable rate coding capable of changing the recording/reproducing amount per unit time. Video data for a more abruptly changing scene can be reproduced with a high quality by increasing the transfer rate of an MPEG stream constituting the frame group corresponding to the scene.

The DVD decoder 15 receives an MPEG2 program stream read by the DVD-ROM drive 142 or an MPEG2 program stream received by the satellite tuner 13 via the PCI bus 10, and decodes the received stream to descramble and expand the stream. As shown in FIG. 1, the DVD decoder 15 is constituted by a PCI interface 151, an MPEG2 decoder 152, a TV encoder 153, a D/A converter (DAC) 154, and a TV image signal output buffer 155.

The PCI/MPEG interface 151 connects the PCI bus 10 and the MPEG2 decoder 152, and sends an MPEG2.stream received via the PCI bus 10 to the MPEG2 decoder 152. The PCI/MPEG interface 151 comprises a video port controller 201. The video port controller 201 transfers digital YUV video data decoded by the MPEG2 decoder 152 to the video input port of the VGA. controller 16 via a video bus having a ZV port and the like.

The MPEG2 decoder 152 decodes the MPEG2 stream received from the PCI/MPEG interface 151, and comprises a descrambling circuit, a multiple MPEG2 stream separating circuit, and video, audio, and sub-picture decoders. Digital YUV data as video and sub-picture decoding results by the MPEG2 decoder 152 are sent as digital signals in the CCIR656 form to the video port controller 201 of the PCI/MPEG interface 151 and the TV encoder 153.

The TV encoder 153 converts the digital YUV data from the MPEG2 decoder 152 into a TV image signal in the NTSC/PAL scheme, and has a composite (C) terminal for outputting a composite signal and an S terminal for outputting color difference signals and a luminance signal. The TV encoder 153 comprises a copy protect circuit 202. The copy protect circuit 202 performs predetermined copy protect processing for the burst signal of the TV image signal in order to prevent the TV image signal from being recorded by a picture recording unit such as a VTR. By copy-protecting the TV image signal, it can be normally displayed on a TV while being prevented from being recorded by a picture recording unit such as a VTR. The copy protect circuit 202 is known as Macrovision, CGMA, or WSS based on the CSS specifications.

The copy-protected TV image signal is converted into an analog signal by the DAC 154, and the analog signal is transferred to a selector 401 via the buffer 155. The selector 401 selects one of the TV image signal obtained by the DVD decoder 15 and a TV image signal obtained by the VGA controller 16 (to be described later), and outputs the selected one to an external TV via the TV image signal output port of the computer main body. The TV image signal. selected by the selector 401 is controlled by a protect signal supplied upon reception of an image source requiring a copy protect. When the protect signal is supplied, the image signal to be output to an external TV is switched from the TV image signal obtained by the VGA controller 16 to the TV image signal obtained by the DVD decoder 15. Further, the selector 401 receives a quality selection signal. Since the TV image signal obtained by the DVD decoder 15 is generally subjected to interlaced processing, the picture quality is high. However, since the TV image'signal obtained by the VGA controller 16 is subjected to noninterlaced processing, it suffer feathering. To remove the feathering, the TV image signal obtained by the VGA controller 16 is filtered, resulting in a low picture quality. If priority is given to the picture quality, an application program issues a quality selection signal to the selector 401 to cause the selector 401 to select the TV image signal obtained by the DVD decoder 15. Alternatively, the user selects the picture quality on the setup menu display to supply a quality selection signal to the selector 401.

The VGA controller 16 controls an LCD display arranged as the display monitor of the computer main body, and an external CRT display, and supports video display in addition to VGA text and graphics display. As shown in FIG. 1, the VGA controller 16 comprises a graphics display controller (GRAPHICS) 161, a video display controller 162, a multiplexer 163, a D/A converter (DAC) 164, analog RGB signal output buffers 165 and 166, a TV encoder 167, a D/A converter (DAC) 168, and a TV analog image signal output buffer 169.

The graphics display controller 161 is a VGA compatible graphics controller, which converts, into RGB video data, VGA/SVGA graphics data stored in the VRAM 17 by the CPU 11 via the PCI bus 10, and outputs the RGB video data. The video display controller 162 is an interface with the above-mentioned digital video input port, and has a YUB-RGB conversion function of converting digital YUV data inputted via a video bus into RGB video data.

The multiplexer 163 selects one of output data from the graphics display controller 161 and the video display controller 162, or synthesizes a video output from the video display controller 162 with VGA graphics data from the graphics display controller 161. Display data output from the multiplexer 163 is sent as digital data to the LCD display via the buffer 165. At the same time, the display data is converted into an analog RGB signal by the D/A converter 164, and the analog signal is sent to an external CRT display via the buffer 166.

The D/A converter 164 and the buffer 166 are controlled by the protect signal described above. Upon reception of the protect signal, the operation of the D/A converter 164 or the buffer 166 stops to inhibit the analog RGB signal from being output externally.

The TV encoder 167 converts the display data output from the multiplexer 163 into a TV image signal in the NTSC/PAL scheme, and has a composite terminal for outputting a composite signal and an S terminal for outputting color difference signals and a luminance signal. The TV image signal obtained by the TV encoder 167 is converted into an analog TV image signal by the D/A converter 168, and the analog signal i's sent to the selector 401 via the buffer 169.

The TV encoder 167, the D/A converter 168, and the buffer 169 are controlled by the protect signal. Upon reception of the protect signal, the operation of the TV encoder 167, the D/A converter 168, or the buffer 169 stops to inhibit the TV analog image signal from being output externally.

In the arrangement of this embodiment, when the protect signal is supplied, the image signal to be output to an external TV is switched by the selector 401 from the TV image signal obtained by the VGA controller 16 to the TV image signal obtained by the DVD decoder 15. In the system arrangement having the selector 401, therefore, the operation of the TV encoder 167, the D/A converter 168, or the buffer 169 need not actually stop. However, some DVD decoders 15 do not have any TV image signal output function. In this case, the TV image signal obtained by the VGA controller 16 is directly output to an external TV. To inhibit the TV analog image signal from being output externally, the operation of the TV encoder 167, the D/A converter 168, or the buffer 169 must stop.

The TV encoder 167 can comprise a copy protect circuit 301 similar to the copy protect circuit 202 of the DVD decoder 15. In this case, the operation of the TV encoder 167, the D/A converter 168, or the buffer 169 need not stop, and the TV image output need not be switched by the selector 401 in accordance with the copy protect signal. Only the analog RGB signal is inhibited from being output to an external CRT display.

Figure 2:
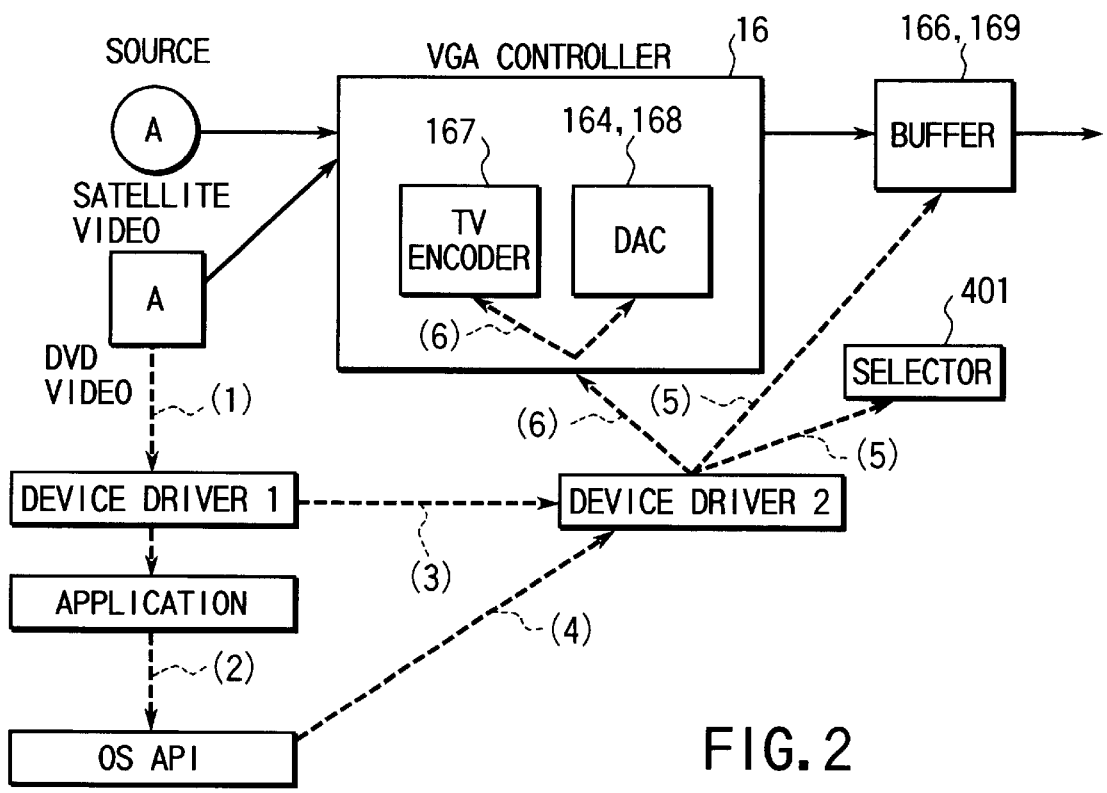
FIG. 2 is a view for explaining a software operation for inhibiting output of an image signal for an external CRT display and a TV in the computer system according to this embodiment.

An operation of inhibiting an image signal from being output to an external CRT display and a TV under software control will be described with reference to FIG. 2.

The type of image source (A) input from the DVD-ROM drive 142 or the satellite tuner 13 is checked via route (1) by a source-side device driver 1 (DVD control device driver, satellite tuner control device driver, DVD decoder control driver, or the like) or a video reproduction application program. In this check, whether the image source (A) requires a copy protect is determined by, e.g., checking the presence of an identifier indicating a copy protect request in control information included in the image source.

The OS or API is informed via route (2) of source information about whether the image source requires a copy protect that is detected by the source-side device driver 1 or the video reproduction application program. The OS or API informs an output device driver 2 (display driver, TV output control driver, or the like) via route (4) of the source information.

If no route (2) is prepared, the source-side device driver 1 or the video reproduction application program directly informs the device driver 2 via route (3) of the source information.

When the device driver 2 informed of the source information recognizes from the source information that the image source requires a copy protect, it writes control data for generating the above protect signal in a predetermined register (VGA register) to switch the selector 401 and disable the buffers 166 and 169 via route (5), and to disable the TV encoder 167 and the DACs 164 and 168 via route (6). With this operation, the analog RGB signal and the TV analog image signal are inhibited from being output externally from the VGA controller 16.

Figure 3:
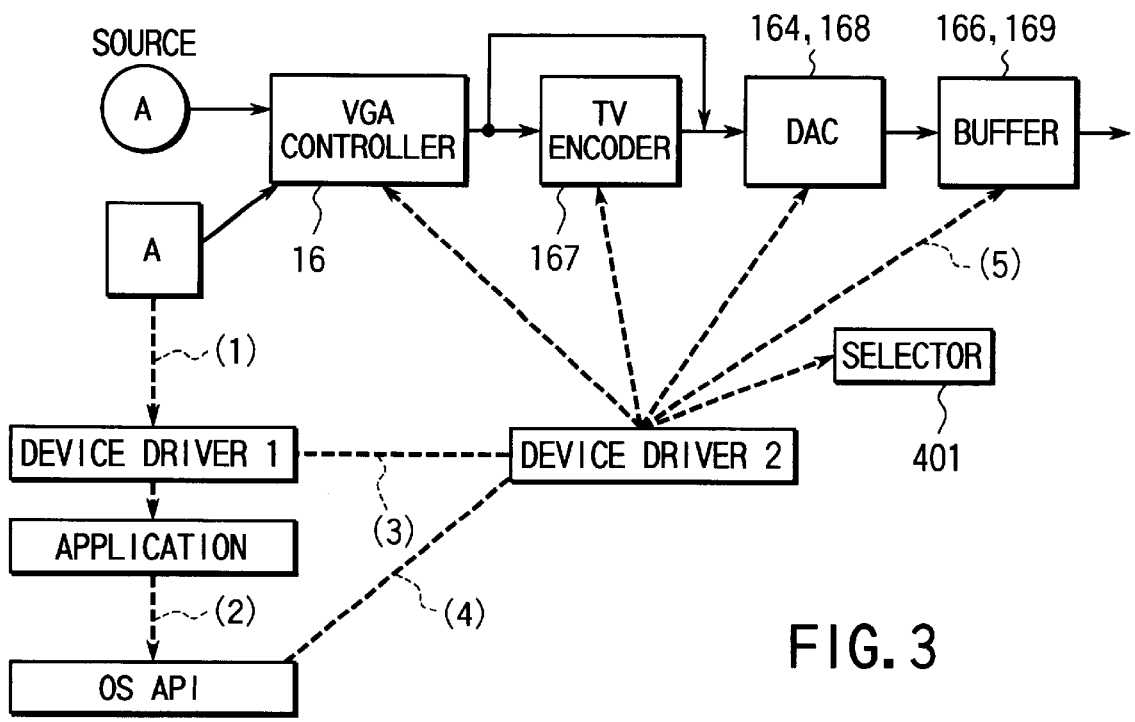
FIG. 3 is a view for explaining another software operation for inhibiting output of an image signal for an external CRT display and a TV in the computer system according to this embodiment.

FIG. 3 shows a control flow when all the TV encoder 167, the DACs 164 and 168, and the buffers 166 and 169 are arranged outside the VGA controller 16.

Also in this case, the type of image source (A) input from the DVD-ROM drive 142 or the satellite tuner 13 is checked via route (1) by the source-side device driver 1 (DVD control device driver, satellite tuner control device driver, DVD decoder control driver, or the like) or a video reproduction application program. In this check, whether the image source (A) requires a copy protect is determined by, e.g., checking the presence of an identifier indicating a copy protect request in control information included in the image source.

The OS or API is informed via route (2) of source information about whether the image source requires a copy protect that is detected by the source-side device driver 1 or the video reproduction application program. The OS or API informs the output device driver 2 (display driver, TV output control driver, or the like) via route (4) of the source information.

If no route (2) is prepared, the source-side device driver 1 or the video reproduction application program directly informs the device driver 2 via route (3) of the source information.

When the device driver 2 informed of the source information recognizes from the source information that the image source requires a copy protect, it writes control data for generating the above protect signal in a predetermined register to switch the selector 401 and disable the buffers 166 and 169, the DACs 164 and 168, and the TV encoder 167 via route (5). Alternatively, a control command may be issued to the VGA controller 16 to inhibit the image signal from being output from the VGA controller 16 to the TV encoder 167 or the DAC 164.

Figure 4:
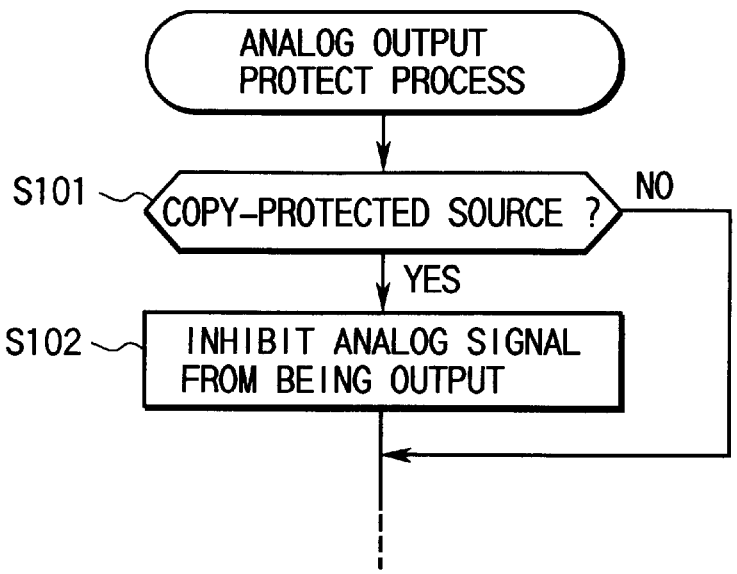
FIG. 4 is a flow chart for explaining an image signal output control procedure applied to the computer system according to this embodiment.

FIG. 4 is a flow chart showing a procedure of controlling output of an image signal for an external CRT display and a TV by software.

The type of image source input from the DVD-ROM drive 142 or the satellite tuner 13 is determined, and whether the inputted image source requires a copy protect is checked (step S101). As described above, whether the image source requires a copy protect can be determined by checking control information included in the image source. However, an image source read from the DVD-ROM drive 142 can be uniquely determined to require a copy protect.

If YES in step S101, a protect signal is generated, and a control command is issued by the register controller to control output of an analog RGB signal and switch the selector (step S102). As a result, a synthesized image of video data requiring a copy protect and graphics data is displayed on the LCD display. To the contrary, only an image of video data requiring a copy protect that is obtained by the DVD decoder 15 is displayed on an external TV.

In disabling the buffers 166 and 169, the DACs 164 and 168, and the TV encoder 167, the supply of an operation power to them may be stopped. This can reduce wasteful power consumption by unnecessary circuits.

External output of an image signal can be controlled by hardware.

In this case, the presence/absence of the DVD-ROM drive 142 is detected by hardware. If the DVD-ROM drive 142 is present, the above protect signal is supplied.

An image signal output control method using hardware will be explained in detail.

Figure 5:
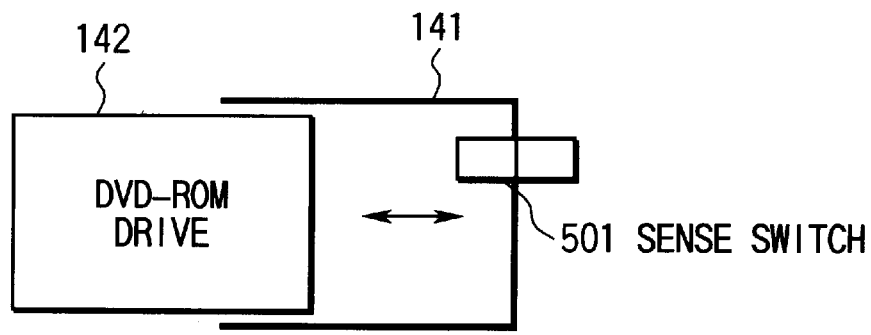
FIG. 5 is a block diagram showing a hardware arrangement for mechanically determining the type of input device in the computer system according to this embodiment.
Figure 6:
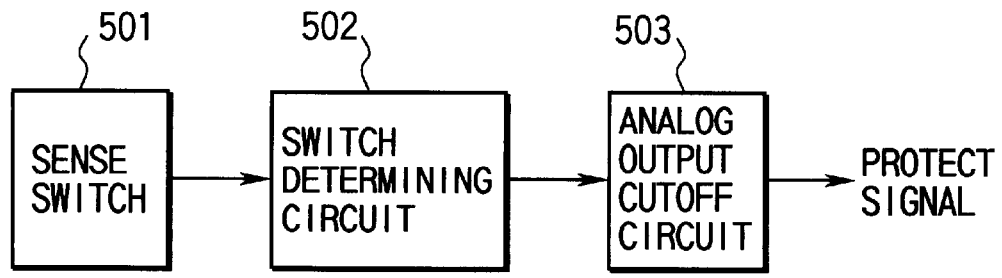
FIG. 6 is a block diagram for explaining a hardware arrangement for controlling output of an image signal in accordance with the type of input device mechanically detected in the computer system according to this embodiment.

FIGS. 5 and 6 show a hardware arrangement for mechanically detecting the presence/absence of the DVD-ROM drive 142.

As shown in FIG. 5, the device bay 141 into which the DVD-ROM drive 142 is loaded comprises a sense switch 501 which is turned on/off in accordance with the loading/unloading of the DVD-ROM drive 142. The sense switch 501 mechanically checks the presence/absence of the DVD-ROM drive 142.

As shown in FIG. 6, the sense switch 501 is connected to a switch determining circuit 502, which detects the ON/OFF state of the sense switch 501. If the switch determining circuit 502 detects the ON state of the sense switch 501, i.e.,the loading of the DVD-ROM drive 142, an analog output stop circuit 503 generates a protect signal to inhibit output of an analog RGB signal and switch the selector.

When the DVD-ROM drive 142 is unloaded from the device bay 141, the sense switch 501 changes from the ON state to the OFF state, thereby canceling inhibition of output of an analog RGB signal. Then, the selector selects a TV image signal from the VGA controller 16.

Figure 7:
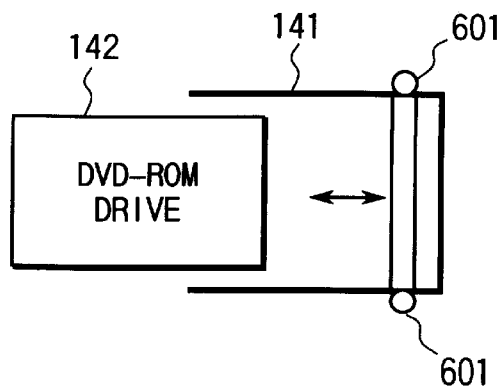
FIG. 7 is a block diagram showing a hardware arrangement for optically determining the type of input device in the computer system according to this embodiment.
Figure 8:
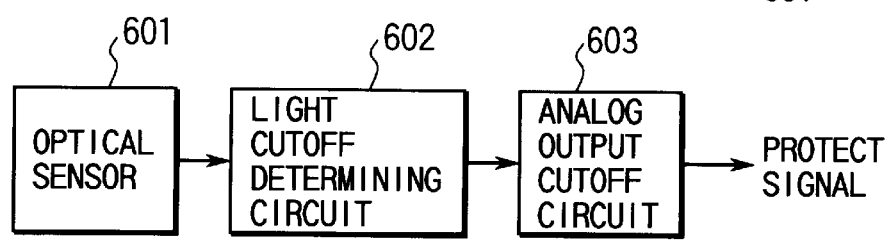
FIG. 8 is a block diagram for explaining a hardware arrangement for controlling output of an image signal in accordance with the type of input device optically detected in the computer system according to this embodiment.

FIGS. 7 and 8 show a hardware arrangement for optically detecting the presence/absence of the DVD-ROM drive 142.

As shown in FIG. 7, the device bay 141 into which the DVD-ROM drive 142 is loaded comprises an optical sensor 601 so as to disconnect/connect an optical path in accordance with the loading/unloading of the DVD-ROM drive 142. The optical sensor 601 optically checks the presence/absence of the DVD-ROM drive 142.

As shown in FIG. 8, the optical sensor 601 is connected to an optical disconnection determining circuit 602, which detects the optical disconnection/connection state of the optical sensor 601. If the optical disconnection determining circuit 602 detects optical disconnection of the optical sensor 601, i.e., the loading of the DVD-ROM drive 142, an analog output stop circuit 603 generates a protect signal to inhibit output of an analog RGB signal and switch the selector.

When the DVD-ROM drive 142 is unloaded from the device bay 141, the optical sensor 601 changes from the optical disconnection state to the optical connection state, thereby canceling inhibition of output of an analog RGB signal. Then, the selector selects a TV image signal from the VGA controller 16.

Figure 9:
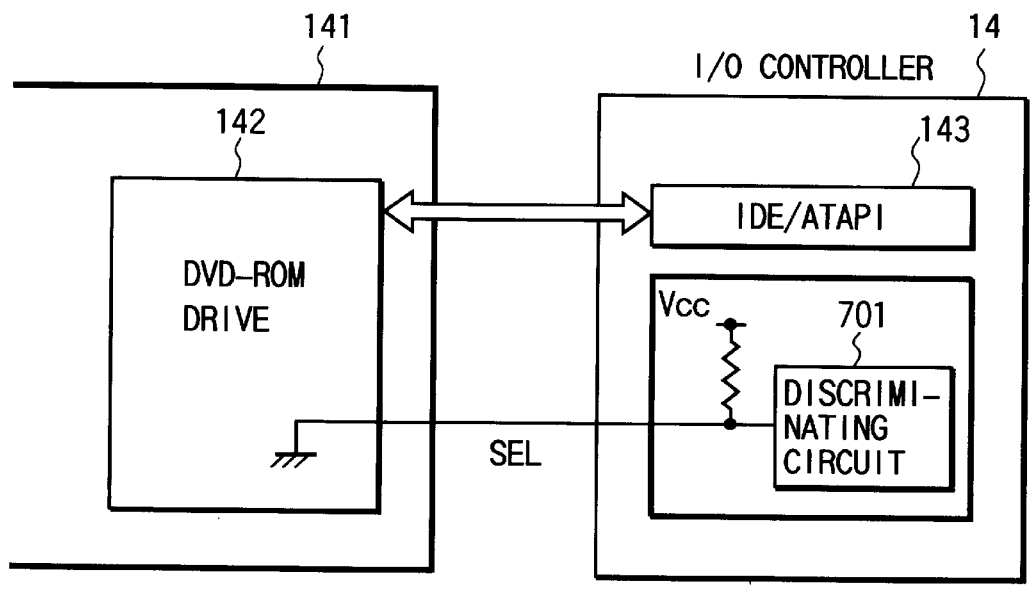
FIG. 9 is a block diagram showing a hardware arrangement for electrically determining the type of input device in the computer system according to this embodiment.
Figure 10:
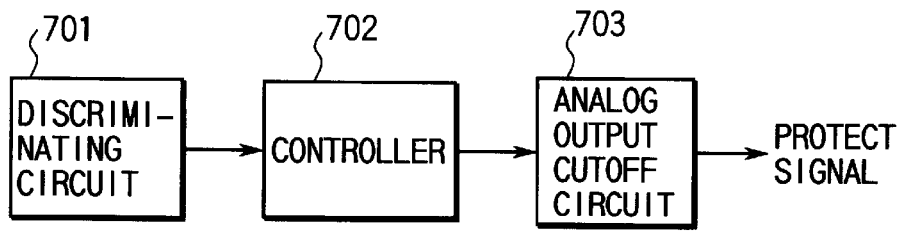
FIG. 10 is a block diagram for explaining a hardware arrangement for controlling output of an image signal in accordance with the type of input device electrically detected in the computer system according to this embodiment.

FIGS. 9 and 10 show a hardware arrangement for electrically detecting the presence/absence of the DVD-ROM drive 142.

As shown in FIG. 9, a device select signal line (SEL) is arranged in addition to an IDE control line between the device bay 141 into which the DVD-ROM drive 142 is loaded, and the I/O controller 14. The IDE control line is connected to an IDE/ATAPI interface circuit 143 in the I/O controller 14. The device select signal line (SEL) is pulled up in the I/O controller 14, and connected to a discriminating circuit 701. On the DVD-ROM drive 142 side, the device select signal line (SEL) is grounded upon loading the DVD-ROM drive 142. When no DVD-ROM drive 142 is loaded, the discriminating circuit 701 holds data "1". When the DVD-ROM drive 142 is loaded, data held by the discriminating circuit 701 changes from "1" to "0".

As shown in FIG. 10, the discriminating circuit 701 is connected to a controller 702, which detects the data value held by the discriminating circuit 701. If the controller 702 detects that data of the discriminating circuit 701 changes from "1" to "0", i.e., that the DVD-ROM drive 142 is loaded, an analog output stop circuit 703 generates a protect signal to inhibit output of an analog RGB signal and switch the selector.

When the DVD-ROM drive 142 is unloaded from the device bay 141, the data value held by the discriminating circuit 701 changes from "0" to "1", thereby canceling inhibition of output of an analog RGB signal. Then, the selector selects a TV image signal from the VGA controller 16.

Figure 11:
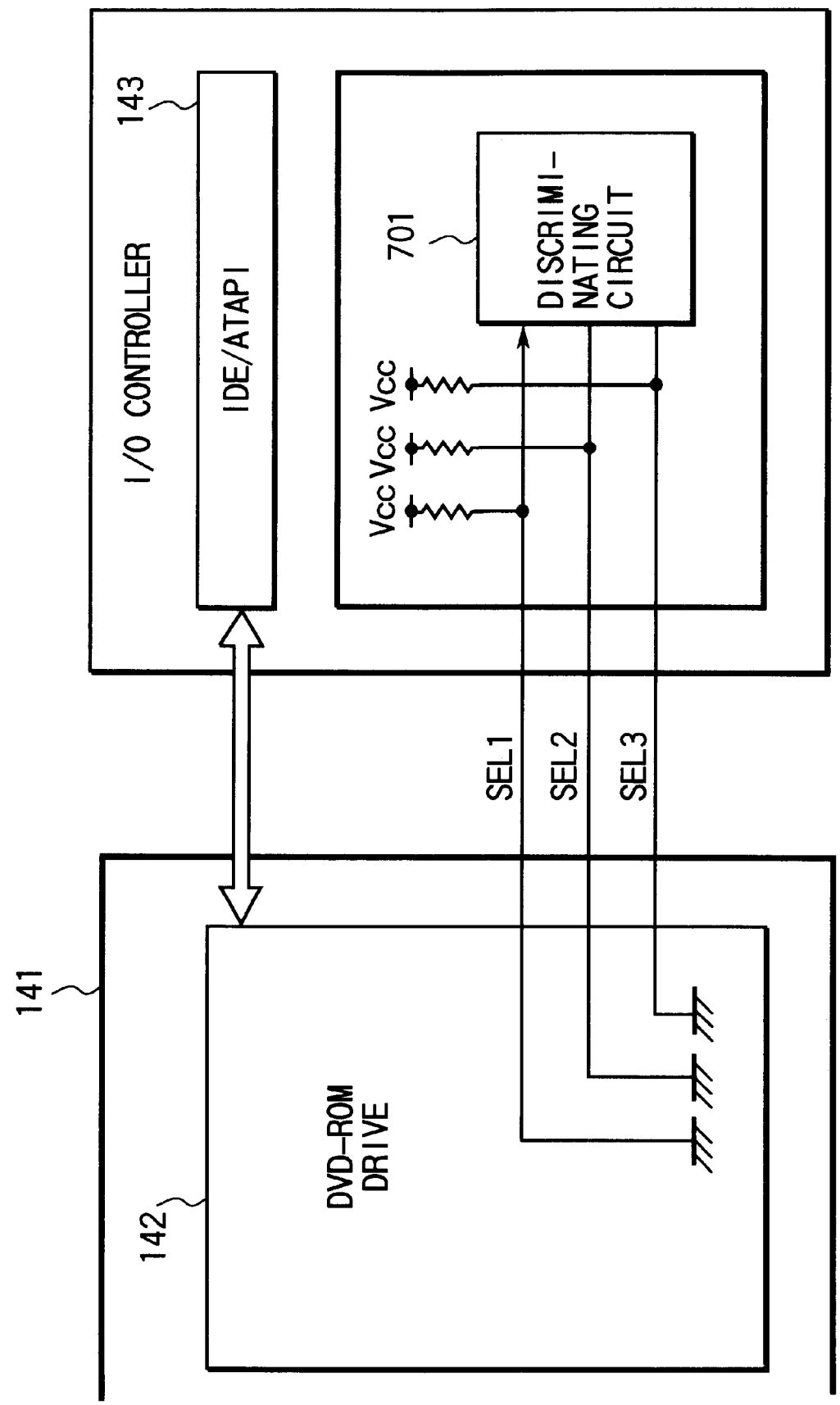
FIG. 11 is a block diagram showing another hardware arrangement for electrically determining the type of input device in the computer system according to this embodiment.

Note that a notebook computer may employ, as the device bay 141, a selectable bay capable of selectively loading various devices such as a CD-ROM drive, the DVD-ROM drive 142, and an expansion hard disk drive because the peripheral device loading area of the notebook computer is limited. In this case, whether a device loaded into the selectable bay 141 is the DVD-ROM drive 142 must be determined. For this purpose, as shown in FIG. 11, a plurality of device select signal lines (SEL1, SEL2, and SEL3) are arranged between the selectable bay 141 and the I/O controller 14. The type of loaded device is determined based on a combination of 3-bit data held by the discriminating circuit 701.

In the example of FIG. 11, when the three bits of data held by the discriminating circuit 701 are all "0"s, the device loaded into the device bay 141 is recognized as the DVD-ROM drive 142.

As has been described above, according to this embodiment, output of an image signal for an external image unit is controlled by determining the type of image source and the type of input device by software or hardware. For example, when a copy-inhibited source such as a DVD title or a digital satellite broadcast is inputted, or the DVD-ROM drive 142 is loaded, output of an image signal for an external CRT display or a TV image signal by the VGA controller 16 is inhibited by disabling the buffers 166 and 169, the DACs 164 and 168, and the TV encoder 167 and switching the selector 401. Accordingly, illicit copying of an image source using output of an image signal for an external image unit can be prevented.

The above embodiment has described the method of controlling external output of an image signal by exemplifying a notebook personal computer. The arrangement of controlling output of an image signal for an external image unit in accordance with the type of image source and the type of input device according to this embodiment can also be applied to a desktop computer, a wordprocessor, a work station, a set-top box, a consumer DVD player, and a game device.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer comprising:
   a decoder configured to decode coded image data and output decoded image data in an interlaced form;
   a protect signal generator configured to determine if the coded image data requires a copy protect, and produce a copy protect signal when the coded image requires a copy protect;
   a copy protect circuit configured to perform copy protect processing on the decoded image data output from the decoder in response to the copy protect signal, and supply copy protected image data to an external display coupled to an external interface;
   a video graphic controller connected to the decoder and configured to convert the decoded image data to graphic data in a non-interlaced form, and supply the graphic data to an internal display and to the external display,
   wherein the video graphic controller does not supply the graphic data to the external display in response to the copy protect signal; and
   a selector configured to select one of the copy protected image data and the graphic data based on the copy protect signal, and supply the selected data to the external display,
   wherein the selector selects the copy protected image data output from the copy protect circuit in response to the copy protect signal.

2. The computer according to claim 1, wherein said video graphic controller comprises a television encoder that converts the decoded image data to television image data that can be displayed by an external display connected to the external interface,
   wherein operation of the encoder is halted in response to the copy protect signal.

3. The computer according to claim 1, wherein said video graphic controller comprises a buffer connected to an internal interface and operatively configured to halt in response to the copy protect signal.

4. The computer according to claim 1, wherein said protect signal generator comprises:
   a device bay in which a disk drive for reading the coded image signal from a disk medium is loaded;
   a sense switch that is activated in response to a loading of a DVD drive; and
   a switch determining circuit which determines that the coded image data requires a copy protect in response to the activation of the sense switch.

5. The computer according to claim 1, wherein said protect signal generator determines whether or not the coded image data requires copy protect in accordance with a predetermined identifier included in the coded image data.

6. A computer comprising:
   a decoder configured to decode coded image data and output decoded image data in an interlaced form;

a protect signal generator configured to determine if the coded image data requires a copy protect, and produce a copy protect signal when the coded image data requires a copy protect; and a video graphic controller connected to the decoder and configured to convert the decoded image data to graphic data in a non-interlaced form, supply the graphic data to an internal display and an external display, and prevent the graphic data from being supplied to the external display in response to the copy protect signal.

7. The computer according to claim 6, wherein said video graphic controller is connected to the internal display through a dedicated internal interface and to the external display through an external interface.

8. The computer according to claim 6, wherein said video graphic controller comprises a buffer connected to the internal display and operatively configured to halt in response to the copy protect signal.

9. An image signal control method for a computer system comprising an internal display and external display, the method comprising:

decoding coded image data and outputting the decoded image data in an interlaced form;

determining if the coded image data requires a copy protect;

producing a copy protect signal when the coded image data requires a copy protect;

performing a process on the decoded image data that copy protects the image data in response to the copy protect signal and supplying the copy protected image data to the external display;

converting the decoded image data into graphic data in a non-interlaced form;

supplying said graphic data to the internal display;

supplying said graphic data to the external display if the copy protect signal is not present; and selecting one of the protected image data and graphic data in response to the copy protect signal and supplying the selected data to the external display.

10. The method of claim 9, wherein converting includes converting the decoded image data into television image data for display on the external display, wherein the converting is halted in response to the copy protect signal.

11. The method of claim 9, wherein converting further includes buffering, wherein the buffering halts in response to the copy protect signal.

12. The method of claim 9, wherein determining if the coded image data requires a copy protect includes reading said data from a disk medium by way of a disk drive loaded in a device bay.

13. The method of claim 12, wherein determining further includes activating a sense switch in response to the loading of a DVD drive into the device bay, wherein said switch indicates that the coded image requires a copy protect.

14. The method of claim 9, wherein determining if the coded image data requires a copy protect is based on a predetermined identifier included in the coded image data.

15. An image signal control method for a computer system comprising an internal display and external display, the method comprising:

decoding coded image data and outputting the decoded image data in an interlaced form;

determining if the coded image data requires a copy protect;

producing a copy protect signal when the coded image data requires a copy protect;

converting the decoded image data into graphic data in a non-interlaced form;

supplying the graphic data to the internal display and external display; and preventing the graphic data from being supplied to the external display in response to the copy protect signal.

16. The method of claim 15, wherein supplying said graphic data to the internal display and external display and preventing said data from being supplied to the external display in response to the copy protect signal is performed through a dedicated internal interface and an external interface.

17. The method of claim 15, wherein converting includes buffering, wherein the buffering halts in response to the copy protect signal.

* * * * *